United States Patent
Nokkentved et al.

(10) Patent No.: US 9,587,773 B2
(45) Date of Patent: Mar. 7, 2017

(54) UNBONDED FLEXIBLE PIPE WITH AN OPTICAL FIBER CONTAINING LAYER

(71) Applicant: National Oilwell Varco Denmark I/S, Brondby (DK)

(72) Inventors: Alexandros Nokkentved, Vaerlose (DK); Bo Asp Moller Andersen, Stenlose (DK); Niels Juul, Herlev (DK); Nicky Weppenaar, Copenhagen K (DK); Kristian Glejbol, Glostrup (DK)

(73) Assignee: NATIONAL OILWELL VARCO DENMARK I/S, Brondby (DK)

(*) Notice: Subject to any disclaimer, the term of this patent is extended or adjusted under 35 U.S.C. 154(b) by 312 days.

(21) Appl. No.: 14/384,238

(22) PCT Filed: Mar. 12, 2013

(86) PCT No.: PCT/DK2013/050064
§ 371 (c)(1),
(2) Date: Sep. 10, 2014

(87) PCT Pub. No.: WO2013/135244
PCT Pub. Date: Sep. 19, 2013

(65) Prior Publication Data
US 2015/0059904 A1 Mar. 5, 2015

(30) Foreign Application Priority Data

Mar. 13, 2012 (DK) .................... 2012 00185
Jul. 6, 2012 (DK) .................... 2012 70409
Dec. 20, 2012 (DK) .................... 2012 70803

(51) Int. Cl.
*F16L 9/00* (2006.01)
*F16L 11/12* (2006.01)
(Continued)

(52) U.S. Cl.
CPC ............. *F16L 11/12* (2013.01); *F16L 11/083* (2013.01); *F16L 11/088* (2013.01); *F16L 55/00* (2013.01); *G01M 3/38* (2013.01); *F16L 2201/30* (2013.01)

(58) Field of Classification Search
CPC .......... F16L 11/02; F16L 11/083; F16L 11/01; E21B 47/0006; E21B 47/01
(Continued)

(56) References Cited

U.S. PATENT DOCUMENTS 3,311,133 A 3/1967 Kinander
3,687,169 A 8/1972 Reynard
(Continued)

FOREIGN PATENT DOCUMENTS

EP 2 065 551 A2 6/2008
GB 1 404 394 A 8/1975
(Continued)

OTHER PUBLICATIONS

Supplementary European Search Report issued in Patent Application No. EP 13 76 1593 dated Oct. 21, 2015.
(Continued)

*Primary Examiner* — Patrick F Brinson
(74) *Attorney, Agent, or Firm* — Pearne & Gordon LLP (57) ABSTRACT

A unbonded flexible pipe with a length and a longitudinal axis is described. The pipe comprises an innermost sealing sheath defining a bore, at least one armor layer surrounding the inner sealing sheath and at least one optical fiber containing layer, wherein the optical fiber containing layer comprises at least one tape and at least one optical fiber arranged with a length of at least about 3 times the length of the flexible pipe. In an embodiment the optical fiber is incorporated into the at least one tape of said optical fiber containing layer to provide an integrated fiber tape where advantageously the optical fiber is arranged with S-shaped folds.

23 Claims, 9 Drawing Sheets (51) Int. Cl.
*F16L 11/08* (2006.01)
*G01M 3/38* (2006.01)
*F16L 55/00* (2006.01)

(58) Field of Classification Search
USPC ................ 138/104, 129, 134, 135, 172, 174
See application file for complete search history.

(56) References Cited

U.S. PATENT DOCUMENTS

| | | | |
|---|---|---|---|
| 3,858,616 | A | 1/1975 | Thiery et al. |
| 4,549,581 | A | 10/1985 | Unno et al. |
| 4,706,713 | A | 11/1987 | Sadamitsu et al. |
| 5,213,637 | A | 5/1993 | Mallen Herrero et al. |
| 5,407,744 | A | 4/1995 | Mallen Herrero et al. |
| 5,601,893 | A | 2/1997 | Strassel et al. |
| 5,645,109 | A | 7/1997 | Herrero et al. |
| 5,669,420 | A | 9/1997 | Herrero et al. |
| 5,730,188 | A | 3/1998 | Kalman et al. |
| 5,813,439 | A | 9/1998 | Herrero et al. |
| 5,837,083 | A | 11/1998 | Booth |
| 5,922,149 | A | 7/1999 | Mallen Herrero et al. |
| 6,016,847 | A | 1/2000 | Jung et al. |
| 6,065,501 | A | 5/2000 | Feret et al. |
| 6,145,546 | A | 11/2000 | Hardy et al. |
| 6,192,941 | B1 | 2/2001 | Mallen-Herrero et al. |
| 6,253,793 | B1 | 7/2001 | Dupoiron et al. |
| 6,283,161 | B1 | 9/2001 | Feret et al. |
| 6,291,079 | B1 | 9/2001 | Mallen Herrero et al. |
| 6,354,333 | B1 | 3/2002 | Dupoiron et al. |
| 6,363,974 | B1 | 4/2002 | Perez et al. |
| 6,382,681 | B1 | 5/2002 | Berton et al. |
| 6,390,141 | B1 | 5/2002 | Fisher et al. |
| 6,408,891 | B1 | 6/2002 | Jung et al. |
| 6,415,825 | B1 | 7/2002 | Dupoiron et al. |
| 6,454,897 | B1 | 9/2002 | Morand |
| 6,516,833 | B1 | 2/2003 | Witz et al. |
| 6,668,867 | B2 | 12/2003 | Espinasse et al. |
| 6,691,743 | B2 | 2/2004 | Espinasse |
| 6,739,355 | B2 | 5/2004 | Glejbøl et al. |
| 6,769,454 | B2 | 8/2004 | Fraser et al. |
| 6,840,286 | B2 | 1/2005 | Espinasse et al. |
| 6,889,717 | B2 | 5/2005 | Coutarel et al. |
| 6,889,718 | B2 | 5/2005 | Glejbøl et al. |
| 6,904,939 | B2 | 6/2005 | Jung et al. |
| 6,978,806 | B2 | 12/2005 | Glejbol et al. |
| 6,981,526 | B2 | 1/2006 | Glejbol et al. |
| 7,024,941 | B2 * | 4/2006 | Andersen ............ E21B 47/0006 73/775 |
| 7,032,623 | B2 | 4/2006 | Averbuch et al. |
| 7,124,780 | B2 | 10/2006 | Dupoiron |
| 7,311,123 | B2 | 12/2007 | Espinasse et al. |
| 7,487,803 | B2 | 2/2009 | Lokere et al. |
| 8,459,306 | B2 * | 6/2013 | Clements ............ E21B 17/015 138/134 |
| 8,789,562 | B2 * | 7/2014 | Kagoura ............ F16L 11/081 138/104 |
| 2003/0102044 | A1 | 6/2003 | Coutarel et al. |
| 2004/0168521 | A1 * | 9/2004 | Andersen ............ E21B 47/0006 73/807 |
| 2006/0151044 | A1 * | 7/2006 | Gurov ............ F16L 9/00 138/129 |
| 2010/0101675 | A1 | 4/2010 | Do et al. |
| 2011/0017337 | A1 * | 1/2011 | Kagoura ............ F16L 11/081 138/121 |
| 2011/0030831 | A1 * | 2/2011 | Clements ............ E21B 17/015 138/109 |
| 2011/0185807 | A1 | 8/2011 | Albrecht et al. |
| 2011/0214771 | A1 | 9/2011 | Graham |
| 2013/0192707 | A1 * | 8/2013 | Graham ............ E21B 47/0006 138/109 |

FOREIGN PATENT DOCUMENTS

| | | |
|---|---|---|
| JP | 2005/030512 A | 2/2005 |
| JP | 2008/267461 A | 11/2008 |
| WO | 2008/025893 A1 | 3/2008 |
| WO | 2008/077409 A1 | 7/2008 |
| WO | 2008/077410 A1 | 7/2008 |
| WO | 2009/024156 A2 | 2/2009 |
| WO | 2011/042023 A1 | 4/2011 |
| WO | 2012/059729 A1 | 5/2012 |
| WO | 2012/059736 A2 | 5/2012 |
| WO | WO 2012059729 A1 * | 5/2012 ......... E21B 47/0006 |
| WO | 2013/135243 A1 | 3/2013 |
| WO | 2013/131972 A1 | 9/2013 |
| WO | 2014/023311 A1 | 2/2014 |

OTHER PUBLICATIONS

DK PA 201270409 application dated Jul. 6, 2012, corresponding to WO2014/023311.
DK PA 2012 00185 application dated Mar. 26, 2013, corresponding to WO 2013/135243.
"Recommended Practice for Flexible Pipe"; ANSI/API Recommended Practice 17B, Fourth Edition; Jul. 2008; pp. 1-213.
"Specification for Unbonded Flexible Pipe"; ANSI/API Specification 17J, Third Edition; Jul. 2008; pp. 1-73.

* cited by examiner

UNBONDED FLEXIBLE PIPE WITH AN OPTICAL FIBER CONTAINING LAYER

TECHNICAL FIELD

The invention relates to an unbonded flexible pipe in particular for offshore and subsea transportation of fluids like hydrocarbons, CO2, water and mixtures hereof.

BACKGROUND ART

Flexible unbonded pipes of the present type are for example described in the standard "Recommended Practice for Flexible Pipe", ANSI/API 17 B, fourth Edition, July 2008, and the standard "Specification for Unbonded Flexible Pipe", ANSI/API 17J, Third edition, July 2008. Such pipes usually comprise an inner liner also often called an inner sealing sheath or an inner sheath, which forms a barrier against the outflow of the fluid which is conveyed in the bore of the pipe, and one or more armoring layers. Often the pipe further comprises an outer protection layer which provides mechanical protection of the armor layers. The outer protection layer may be a sealing layer sealing against ingress of sea water. In certain unbonded flexible pipes one or more intermediate sealing layers are arranged between armor layers.

In general flexible pipes are expected to have a lifetime of 20 years in operation.

Examples of unbonded flexible pipes are e.g. disclosed in U.S. Pat. No. 6,978,806; U.S. Pat. No. 7,124,780; U.S. Pat. No. 6,769,454 and U.S. Pat. No. 6,363,974.

The term "unbonded" means in this text that at least two of the layers including the armoring layers and polymer layers are not bonded to each other. In practice the known pipe normally comprises at least two armoring layers located outside the inner sealing sheath and optionally an armor structure located inside the inner sealing sheath normally referred to as a carcass.

These armoring layers comprise or consist of multiple elongated armoring elements that are not bonded to each other directly or indirectly via other layers along the pipe. Thereby the pipe becomes bendable and sufficiently flexible to roll up for transportation.

During transportation, installation and use such unbonded flexible pipes will be subjected to mechanical, thermal and chemical impacts and wear. Usually the unbonded flexible pipe will be qualified to a level beyond what is actually required and often the unbonded flexible pipe will be taken out of use at a time where it is still intact and could have been used for longer time. For a number of years, it has been attempted to incorporate various sensor arrangement into or onto the unbonded flexible pipe to monitor the impacts that the pipe is subjected to and to follow wear and possible damage in order to optimize the use of the pipe and optionally to improve knowledge for use in qualification of future unbonded flexible pipe.

U.S. Pat. No. 7,024,941 describes a method of mounting a sensor arrangement, such as an optical sensor into a reinforcement layer of a flexible pipe. The reinforcement layer is in the form of helically wound metallic armor element(s) and the sensor arrangement is mounted in a groove provided in the metallic armor element where it is fixed with an epoxy material or similar.

WO2008077410A1 describes another method of mounting an optical fiber in an armor element of a flexible pipe, where the armor element comprises a folded metal strip and the sensor placed in a fold of the metal strip for mechanical protection.

WO 2012/059729 describes a flexible pipe with a tensile armor layer of helically wound wires comprising an optical fiber. The optical fiber is arranged in a crush resistant carrier rod in replacement of a wirer of the tensile armor layer.

EP 2065551 describes a flexible pipe comprising a carcass and an extruded polymer layer on the outer side of the carcass wherein a plurality of optical fibers are embedded in the polymer layer for monitoring pressure within the extruded polymer layer. Herein it is also described that a sensor fiber can be incorporated into an armor layer by being arranged in a carrier rod replacing an armor element.

WO2011042023 describes a flexible pipe comprising an internal sheath, at least one armor layer surrounding the internal sheath and a bore defined by the internal sheath where the flexible pipe further comprises a fiber sensor arranged in the bore, such as in a protecting element in the form of a coil or a tube shaped lattice of polymer and/or metal.

DISCLOSURE OF INVENTION

An object of the present invention is to provide an unbonded flexible pipe comprising an optical fiber for use in monitoring at least one parameter of the pipe during operation, which optical fiber is simple to incorporate into the unbonded flexible pipe while simultaneously the optical fiber is safely protected against mechanical damage even where the unbonded flexible pipe is applied in dynamic applications, such as being used for a riser pipe.

A further object of the present invention is to provide an unbonded flexible pipe comprising an optical fiber for use in monitoring at least one parameter with a relatively high resolution and high degree of accuracy in relation to position along the length of the pipe.

These objects have been solved by the invention as defined in the claims and described herein.

It has been found that the invention and embodiments thereof have a number of additional advantages which will be clear to the skilled person from the following description.

According to the invention it has surprisingly been found that by providing the unbonded flexible pipe with a optical fiber containing layer comprising at least one tape and at least one optical fiber arranged with an overlength in the form of a length of at least about 3 times the length of the flexible pipe, an unbonded flexible pipe comprising an optical fiber for use in monitoring at least one parameter with a very high resolution and high degree of accuracy in relation to position along the length of the pipe has been achieved. Simultaneously the optical fiber is simple to incorporate into the unbonded flexible pipe and it has further been found that the optical fiber is safely protected against mechanical damage even where the unbonded flexible pipe is applied in dynamic applications, such as in use for a riser pipe.

Further, the arrangement of the optical fiber in the unbonded flexible pipe does not result in a weakening of an armor layer of the unbonded flexible pipe because the arrangement of the optical fiber is not on the expense of an armor wire, i.e. the optical fiber is not arranged in a carrier rod in replacement of a wirer of an armor layer.

The phrase that the optical fiber is arranged with an overlength means that it has a length which exceeds the length of the unbonded flexible pipe. An overlength of at least about 3 times the length of the flexible pipe means that the length of the optical fiber in a length section of the unbonded flexible pipe is at least about 3 times longer that the length section in question.

As described above in the discussion of the prior art it is well known to arrange the optical fiber with an overlength relative to the unbonded flexible pipe, however, heretofore the overlength provided has exclusively had the purpose of allowing the unbonded flexible pipe to bend without damaging the optical fiber, i.e. the overlength of the optical fiber in the prior art pipes is about 50% (1½ times the pipe length). Heretofore, it has neither been considered to apply a larger overlength, nor has it been considered that anything could be achieved using such larger overlength. Furthermore, using the prior art constructions does not make it possible to provide an optical fiber overlength of at least about 3 times the length of the flexible pipe and simultaneously ensure a safe protection of the optical fiber.

The term "tape" is herein used to mean a long flat and flexible strip comprising polymer and/or fabric, which is narrow relative to its length, preferably with a width determined perpendicularly to its length of up to about 1 m and with a thickness determined perpendicularly to its width and length of up to about 20% of its width, advantageously of up to about 10% of its width.

It should be emphasized that the term "comprises/comprising" when used herein is to be interpreted as an open term, i.e. it should be taken to specify the presence of specifically stated feature(s), such as element(s), unit(s), integer(s), step(s) component(s) and combination(s) thereof, but does not preclude the presence or addition of one or more other stated features.

The term "substantially" should herein be taken to mean that ordinary product variances and tolerances are comprised.

The terms "inside" and "outside" a layer of the pipe are used to designate the relative distance to the axis of the pipe, such that "inside a layer" means the area encircled by the layer, i.e. with a shorter axial distance than the layer, and "outside a layer" means the area not encircled by the layer and not contained by the layer, i.e. with a shorter axial distance than the layer.

The term "inner side" of a layer is the side of the layer facing the axis of the pipe. The term "outer side" of a layer is the side of the layer facing away from the axis of the pipe.

The term "innermost layer" means the layer closest to the centre axis of the pipe seen in radial direction, and accordingly the "outermost layer" means the layer farthest from the centre axis of the pipe seen in radial direction.

The term "winding direction" means winding direction relatively to the longitudinal axis of the unbonded flexible pipe unless otherwise specified.

Filaments are continuously single fiber (also called monofilament).

The phrase "continuous" as used herein in connection with fibers, filaments, strands or rovings means that the fibers, filaments, strands, yarns and/or strands or rovings generally have a significant length but should not be understood to mean that the length is perpetual or infinite. Continuous fibers, such as continuous filaments, strands, yarns and/or strands or rovings preferably have a length of at least about 10 m, preferably at least about 100 m, more preferably at least about 1000 m.

The term "strand" is used to designate an untwisted bundle of filaments.

The term "yarn" is used to designate a twisted bundle of filaments and/or cut fibers. Yarn includes threads and ropes. The yarn may be a primary yarn made directly from filaments and/or cut fibers or a secondary yarn made from yarns and/or strands and/or cords. Secondary yarns and/or strands are also referred to as cords.

The unbonded flexible pipe of the invention has length and a longitudinal axis and comprises an innermost sealing sheath defining a bore, at least one armor layer surrounding the inner sealing sheath and at least one optical fiber containing layer.

The unbonded flexible pipe can have other layers e.g. as described in "Recommended Practice for Flexible Pipe", ANSI/API 17 B, fourth Edition, July 2008, and the standard "Specification for Unbonded Flexible Pipe", ANSI/API 17J, Third edition, July 2008.

The optical fiber containing layer comprises at least one tape and at least one optical fiber arranged with a length of at least about 3 times the length of the flexible pipe.

Advantageously, the optical fiber containing layer consists essentially of one or more tapes and the one or more optical fibers, at least one optical fiber arranged with a length of at least about 3 times the length of the flexible pipe. This optical fiber containing layer has shown to ensure a good protection of the optical fiber or optical fibers.

In the following description the term "tape" element when used in singular should be interpreted to also include the plural meaning of the term unless it is specifically stated or it is clear that it means a single tape.

In the following description where the unbonded flexible pipe is described with the term "optical fiber" element used in singular, however, it should be understood that the unbonded flexible pipe could comprise several optical fibers e.g. in the optical fiber containing layer or in one or more other layers of the pipe.

In order to obtain a very high degree of accuracy in relation to the determined parameter position along the length of the pipe, the optical fiber is advantageously arranged with a length of at least about 4 times the length of the flexible pipe, such as with a length of at least about 5 times the length of the flexible pipe, such as with a length of at least about 6 times the length of the flexible pipe, such as with a length of at least about 7 times the length of the flexible pipe, such as with a length of at least about 8 times the length of the flexible pipe, such as with a length of at least about 9 times the length of the flexible pipe, such as with a length of at least about 10 times the length of the flexible pipe.

Depending on the parameter determined the degree of overlength of the optical fiber in relation to the length of the pipe can be selected to provide a desired balance between length of optical fiber and accuracy of the position for the determined parameter.

The parameter is determined in a plurality of positions along the length of the optical fiber, and by using the configuration of the optical fiber in relation to the unbonded flexible pipe the position for the respective determinations can be calculated with a high accuracy both with respect to the parameter and with respect to the position along the length of the pipe of the determined parameter.

Due to the construction of the optical fiber containing layer, the high optical fiber overlength can be achieved in several ways for example by providing that the optical fiber is helically wound and/or arranged with folds to ensure its length of at least about 3 times the length of the flexible pipe.

The folds are advantageously S-shaped folds. The term S-shaped folds is used to include any folds with curving folds, where the curving folds can be equal or different from each other and where the amplitude of the curving folds can be equal or different from each other. Advantageously the S-shaped folds are harmonic folds with equal curved shape and equal amplitude. Thereby the parameter in question e.g. the temperature along the length of the pipe will be simpler to determine with high accuracy.

In an embodiment the at least one tape of the optical fiber containing layer is helically wound to surround the longitudinal axis of the flexible pipe.

In an embodiment the at least one tape of the optical fiber containing layer is arranged with folds along the length of the flexible pipe.

In an embodiment the at least one tape of the optical fiber containing layer is folded to partly or fully surround the longitudinal axis of the flexible pipe.

In an embodiment the at least one tape of the optical fiber containing layer is arranged with length direction corresponding to the longitudinal axis of the flexible pipe.

Advantageously the optical fiber containing layer comprises a plurality of tapes thereby providing a safe protection of the optical fiber. Preferably at least one tape of the optical fiber containing layer is helically wound to surround the longitudinal axis of the flexible pipe, is arranged with folds along the length of the flexible pipe, is folded to partly or fully surround the longitudinal axis of the flexible pipe (correspond to a wrapping) and/or is arranged with length direction corresponding to the longitudinal axis of the flexible pipe (straight). In principle the optical fiber containing layer may comprise tapes arranged with different configuration, however, for simple construction it is advantageous to apply the plurality of tapes of the optical fiber containing layer with similar configuration selected from, wound, with folds, folded or straight.

The tape has a length direction and a width perpendicular to its length direction. The width of the tape is advantageously constant along the length of the tape for simple construction. The width of the tape can in principle have any size, however, for effective handling and for cost effective production it is generally desired that the width of the tape is at least about 3 cm. Preferably the width of the tape is at least about 5 cm, such as at least about 10 cm, such as at least about 15 cm, such as at least about 20 cm, preferably the width of the tape is from about 5 cm to about 15 cm. In optimal solutions the width of the tape is in the range of from about 5-15 cm. If the tape is too wide it may be difficult to handle and to apply without undesired wrinkles and/or irregularities.

The tape of the optical fiber containing layer has a thickness determined in axial direction of the pipe. Advantageously the thickness of the tape is relatively low to allow for a high flexibility, however, simultaneously a very thin tape may require a high number of tapes in order to provide a desired protection of the optical fiber. Advantageously the thickness of the wound tape is up to about 4 mm, such as up to about 3 mm, such as up to about 2 mm. Preferably the thickness of the tape is from about 1 mm to about 3 mm.

In an embodiment the tape has a thickness of from about 10% to about 200% of the diameter of the optical fiber. In an embodiment the tape has a thickness of from about 50% to about 150% of the diameter of the optical fiber, such from 1 mm to about 2.5 mm.

The thickness of the optical fiber is determined as the thickness of the optical fiber including optionally coatings, such as coatings applied for chemical and or mechanical coating. In principle such coatings advantageously should be very thin in particular where the optical fiber is used for temperature monitoring. In an embodiment the optical fiber comprises a thin steel coating of about 0.1 to about 0.2 mm e.g. about 0.125 mm. For corrosion protection the steel can be coated with a thin polymer layer e.g. a fluoride containing polymer payer, such a PVDF e.g. a PVDF coating of about 50 to about 200 μm.

In order to provide a good protection of the optical fiber the optical fiber containing layer advantageously has a thickness determined in axial direction of the pipe of at least about 1 mm. In an embodiment the thickness of the optical fiber containing layer is up to about 5 mm, such as up to about 4 mm, such as up to about 3 mm. Preferably, the thickness of the optical fiber containing layer is from about 1 mm to about 3 mm.

In general the tape can be or comprise any polymer material and combinations thereof. In an embodiment the tape of the optical fiber containing layer is a polymer tape. Advantageously the polymer tape is or comprises a homopolymer or a copolymer comprising at least one of the materials in the group comprising polyolefins, e.g. polyethylene or polypropylene (PP), such as stiff linear copolymer PP with a branched homopolymer PP; polyoxyethylenes (POE); cycloolefin copolymers (COC); polyamides (PA), e.g. polyamide-imide, polyamide-11 (PA-11), polyamide-12 (PA-12) or polyamide-6 (PA-6)); polyimide (PI); polyurethanes such as polyurethane-isocyanurate; polyureas; polyesters; polyacetals; polyetherssuch as polyether sulphone (PES); polyoxides; polysulfides, such as polyphenylene sulphide (PPS); thermoplastic elastomers, such as styrene block copolymers, such as poly(styrene-block-butadiene-block-styrene) (SBS) or their selectively hydrogenated versions SEBS and SEPS; thermoplastic polyolefins (TPO) e.g. comprising SEBS and/or SEPS; polysulphones, e.g. polyarylsulphone (PAS); polyacrylates; polyethylene terephthalates (PET); polyether-ether-ketones (PEEK); polyvinyls; polyacrylonitrils (PAN); polyetherketoneketone (PEKK); and/or copolymers of the preceding; fluorous polymers e.g. polyvinylidene diflouride (PVDF), homopolymers or copolymers of vinylidene fluoride ("VF2"), homopolymers or copolymers of trifluoroethylene ("VF3"), copolymers or terpolymers comprising two or more different members selected from VF2, VF3, chlorotrifluoroethylene, tetrafluoroethylene, hexafluoropropene, or hexafluoro-ethylene.

In an embodiment the tape is of composite material comprising or consisting of polymer and reinforcement elements. Preferably the reinforcement element comprises fibers and/or solid and/or hollow microspheres (beads), e.g. made from glass, polymer, basalt or silica, more preferably the reinforcement element comprises or consists of fibers, such as glass fibers, carbon fibers, aramide fibers, silica fibers such as basalt fibers, steel fibers, polyethylene fibers, polypropylene fibers, mineral fibers, and/or any combination thereof.

In an embodiment the tape comprises a fabric in the form of a woven tape comprising woven yarns and/or strands. Preferably the tape comprises woven yarns and/or strands comprising filaments selected from carbon filaments, glass filaments, basalt filaments, polymer filaments and combinations thereof preferably impregnated with a thermoplastic resin, such as a thermoplastic resin comprising polyamide (PA), polybutylene terephthalate (PBT), thermoplastic polyester (PET), polycarbonate (PC), polyethylene (PE), polypropylene (PP), polyvinyl chloride (PVC) and mixtures comprising one or more of these thermoplastic resins.

The optical fiber is adapted to be a part of a sensor system for monitoring at least one parameter. The system for monitoring at least one parameter may be configured for continuously monitoring, for ad-hoc monitoring or for individual determination of the one or more parameters along the length of the unbonded flexible pipe. The parameter can for example be strain, vibration, sound, pressure and/or temperature.

In an embodiment the optical fiber is a part of a sensor system configured to sensing strain, vibrations, pressure and/or sound.

Advantageously the optical fiber is a part of a temperature sensor system, such as a distributed sensor system e.g. an OTDR (Optical Time Domain Reflectometry) based sensor or an OFDR (Optical Frequency Domain Reflectometry) based or a FBG (Fiber Bragg distributed) based sensor or a Brillouin Scattering Based Sensor. It has been found that where the optical fiber is a part of a temperature sensor system a very accurate temperature determination along the length of the unbonded flexible pipe can be achieved and even small temperature variations can be registered. Since local overheating potentially can damage polymer layers, such as an outer sheath of an unbonded flexible pipe, and since a local decrease in temperature may result in undesired formation and deposition of clathrate hydrates within the bore, it is extremely advantageously to monitor the temperature and optionally regulate the flow of fluid in the pipe and/or provide cooling or heating to avoid an undesired temperature.

In an embodiment the at least one tape and the at least one optical fiber are helically wound to surround the longitudinal axis of the flexible pipe.

To achieve the desired optical fiber overlength with respect to the unbonded flexible pipe is advantageously wound with a relatively high winding degree or the overlength is obtained by a combination of helical winding and folds.

The tape may in principle be wound with any winding degree. In an embodiment tape of the optical fiber containing layer is wound with an angle to the longitudinal axis which is at least about 35 degrees, such as from about 40 degrees to about 89 degrees, such as from about 45 degrees to about 87 degrees, such as from about 55 degrees to about 85 degrees.

In an embodiment the tape of the optical fiber containing layer is wound with an angle to the longitudinal axis which is at least about 55 degrees, such as from about 60 degrees to about 89 degrees, such as from about 70 degrees to about 80 degrees.

In an embodiment the tape of the optical fiber containing layer is wound with an angle to the longitudinal axis which is about 55 degrees or less, such as from about 35 degrees to about 50 degrees.

The winding degree of the optical fiber may be equal to or different from the winding degree of the tape.

In an embodiment the optical fiber is wound with an angle to the longitudinal axis which is substantially identical to the winding direction of the helically wound tape.

Advantageously the tape is wound with a helical gap between windings thereof and the optical fiber is arranged in the helical gap. Thereby a very safe protection of the optical fiber is provided.

In an embodiment the optical fiber containing layer comprises a plurality of helically wound tapes, and at least one of the helically wound tapes is wound above or below the optical fiber in the helical gap to provide additional protection. Advantageously at least one of the helically wound tapes is wound above or below the optical fiber in the helical gap to separate the optical fiber from a metallic armor layer. Optionally at least one of the helically wound tapes is wound above the optical fiber in the helical gap and at least one of the helically wound tapes is wound below the optical fiber in the helical gap.

The terms "above" and "below" in relation to the optical fiber is herein used to mean above and below as seen in radial direction of the pipe.

In an embodiment the optical fiber containing layer does not comprise any helically wound tape above or below the optical fiber in the helically gab.

In an embodiment the optical fiber is wound with an angle to the longitudinal axis which is different from the winding direction of the helically wound tape(s).

In an embodiment the optical fiber is wound with an angle to the longitudinal axis which is at least about 55 degrees, such as from about 60 degrees to about 89 degrees, such as from about 70 degrees to about 80 degrees.

In a preferred embodiment the optical fiber is incorporated into the at least one tape of the optical fiber containing layer to provide an integrated fiber tape. This embodiment provides a very simple handling of the optical fiber during production and ensures an accurate positioning of the optical fiber along the length of the pipe.

In an embodiment the optical fiber is incorporated into the tape of the optical fiber containing layer by being partly or fully embedded into the tape. In this embodiment the tape is advantageously a thermoplastic polymer tape and the sensor is partly or fully depressed into the tape while it is plasticized or the sensor is arranged in the tape during extrusion thereof.

Advantageously the optical fiber is incorporated into the tape of the optical fiber containing layer by being held between two sub-layers of the tape. This embodiment provides a very simple and safe manufacturing method.

The two sub-layers of the tape can be equal or different from each other in thickness and/or in composition. Advantageously the two sub-layers of the tape are substantially equal at least in composition. In an embodiment the two sub-layers of the tape are substantially equal to each other both in thickness and in composition.

In an embodiment the sub-layers of the tape are fused or adhered together. For simple production the two sub-layers of the tape are simply fused together in the desired regions using heat. The sub-layers of the tape are fused or adhered together allowing a clearance zone along at least a part of the length of the optical fiber to not be fused or adhered. Thereby the optical fiber can slide with respect to the tape when the tape is subjected to stretching for example when the unbonded flexible pipe is subjected to bends.

In an embodiment the optical fiber is encased by the tape without being fixed thereto. Thereby the optical fiber can slide with respect to the tape when the tape is subjected to stretching for example when the unbonded flexible pipe is subjected to bends.

In an embodiment the optical fiber is encased by the tape and fixed thereto at selected positions along its length, allowing intermediate length sections of the optical fiber to be not fixed to the tape. Advantageously, the intermediate length sections are substantially longer than the fixed positions. In this embodiment the fixing of the optical fiber to the tape at selected positions can be used to provide an accurate positioning of the optical fiber relative to the tape e.g. with desired folds.

In an embodiment the optical fiber is arranged to be substantially straight along the length of the tape.

Advantageously the optical fiber is arranged with folds along the length of the tape. Thereby a simple and effective way of providing the desired overlength of the optical fiber with respect to the unbonded flexible pipe is provided. As the tape with the incorporated optical fiber can be produced separately of the production of the unbonded flexible pipe, this method provides a very effective and cost saving method of producing an unbonded flexible pipe with an optical fiber with a high overlength. In this connection it should also be observed that the unbonded flexible pipe often is very long, such a 1 kilometer or longer e.g. even 2 or 3 kilometers or longer, the length of optical fiber required is very high, and it may be necessary to splice the optical fiber. Such splicing of optical fiber requires special equipment and clean room facilities. Production of the tape with incorporated overlength of optical fiber separately from production of the unbonded flexible pipe—e.g. at a separate production site results in large savings and simultaneously a higher quality of the tape with incorporated optical fiber can be expected.

Advantageously the optical fiber is arranged with folds along the length of the tape to provide an overlength of the optical fiber with respect to the tape of at least about 2 times the length of the tape, such as at least about 3 times the length of the tape.

Preferably the optical fiber is arranged with S-shaped folds, such as the S-shaped folds described above. Advantageously the S-shaped folds are harmonic S-shaped folds.

Advantageously the tape is elastic at least in its length direction. Thereby the tape can be applied to the optical fiber containing layer in any configuration while still allowing the unbonded flexible pipe to be coiled as it usually will be prior to deployment or to bend as it usually will be during deployment and under use e.g. as a riser pipe. By providing the tape with the incorporated optical fiber in overlength with a desired elasticity a very effective way of providing a unbonded flexible pipe with a high overlength of optical fiber is provided.

Advantageously the tape in its length direction has a linear elasticity of at least about 3%, preferably the tape in its length direction has a linear elasticity of at least about 5%, such as at least about 10%, such as at least about 20%, such as at least about 30%, such as at least about 40%, such as at least about 50%.

The elasticity of the tape is advantageously selected such that the estimated bends of the unbonded flexible pipe result in stretching of the tape within its elastic region i.e. the tape is advantageously not stretched beyond its yield strength point where plastic deformation takes place. In the linear elastic region of the tape the tape will return to its original shape after a stretch due to a bend of the unbonded flexible pipe.

In a preferred embodiment the tape in its length direction has a linear elasticity of from about 25% to about 500%, such as from about 50% to about 300%, such as from about 75% to about 200%. Such high elasticity provides a tape with incorporated optical fiber which can be applied in any configurations even as a tape applied with its length direction substantially perpendicular to the longitudinal axis of the unbonded flexible pipe.

In an embodiment the tape is or comprises a woven material. The woven material is preferably woven such that it has a high elasticity in its length direction. Advantageously the woven material comprises woven yarns and/or strands of filaments comprising filaments of at least one polymer, preferably at least one elastomer, such as rubber (natural or synthetic) and/or thermoplastic elastomer.

Examples of suitable elastomers include styrenic block copolymers, polyolefin blends, elastomeric alloys (TPE-v or TPV), thermoplastic polyurethanes, thermoplastic copolyester and thermoplastic polyamides.

In an embodiment the yarns and/or strands comprise thermoplastic polymer, such as aramide filaments, polypropylene filaments, polyethylene filaments, polycarbonate filaments, thermoplastic polyester filaments and mixtures thereof.

In an embodiment the tape is or comprises a non-woven tape, such as an extruded tape, the tape is optionally a laminated tape. Advantageously the tape comprises or consists of polymer such as an elastomer, such as rubber (natural or synthetic) and/or a thermoplastic elastomer.

In an embodiment the tape comprising the incorporated optical fiber is arranged with its length direction substantially parallel to the longitudinal axis of the flexible pipe.

In an embodiment the tape comprising the incorporated optical fiber is helically wound to surround the longitudinal axis of the flexible pipe or is arranged with folds along the length of the flexible pipe. In this embodiment the high overlength of the optical fiber relative to the unbonded flexible pipe can be obtained both by providing folds on the incorporated optical fiber in the tape and by the helical configuration of the tape with the incorporated optical fiber. The tape with the incorporated optical fiber can thereby be wound with a very low winding degree and still provide a high optical fiber overlength relative to the length of the unbonded flexible pipe.

In an embodiment the tape comprising the incorporated optical fiber arranged with folds along the length of the tape is helically wound to surround the longitudinal axis of the flexible pipe with a winding degree of from about 10 to about 55 degrees, such as from about 20 to about 45 degrees.

The optical fiber containing layer can in principle be arranged anywhere in the unbonded flexible pipe between the innermost and the outermost layer thereof.

In an embodiment wherein the unbonded flexible pipe comprises a carcass optionally the optical fiber containing layer is arranged between the carcass and the innermost sealing sheath.

In an embodiment the optical fiber containing layer is arranged outside the innermost sealing sheath.

In an embodiment, wherein the unbonded flexible pipe comprises one or more armor layers arranged outside the innermost sealing sheath, the optical fiber containing layer is arranged outside the one or more armor layers.

In an embodiment, wherein the unbonded flexible pipe comprises an outer protecting layer, the optical fiber containing layer is arranged inside the outer protecting layer.

In a preferred embodiment, wherein the unbonded flexible pipe comprises one or more armor layers arranged outside the innermost sealing sheath and an outer liquid impervious protecting layer, the optical fiber containing layer is arranged between the armor layer(s) and the outer liquid impervious protecting layer.

Advantageously the optical fiber containing layer is arranged outside the outermost armor layer, preferably between the outermost armor layer and an outer protecting layer and the optical fiber is a part of a temperature monitoring system e.g. for protecting the outer protecting layer against overheating. Where for example an element such as a bend limiter and/or a buoyancy module or similar is fixed on the outer side of the outer protection layer, it will be observed that the temperature monitored will be higher than where sea water is in direct contact with the outer side of the outer protection layer. If the temperature at such position is rising toward a dangerous level where the outer protection layer is at risk of being damaged, the temperature can be reduced by cooling and/or by reducing the flow rate of warm fluid in the bore of the pipe. Since the temperature can be closely monitored, the production rate can simultaneously be optimized since the safety margin can be reduced.

In an embodiment the unbonded flexible pipe comprises a first and a second end and a length between the first and the second ends and the helically wound one optical fiber is arranged in the optical fiber containing layer in at least a part of the length of the unbonded flexible pipe between the first and the second end. Advantageously the optical fiber containing layer is arranged in the whole of the length of the unbonded flexible pipe. However, in certain embodiments and for cost reasons it may sometimes be advantageous to apply the optical fiber containing layer in only a part of the length of the unbonded flexible pipe.

The optical fiber can exit the unbonded flexible pipe by any known constructions, advantageously relatively near one end of the unbonded flexible pipe to be connected to the remaining of the monitoring system. Alternatively the optical fiber can be connected to a remote light source and a transmitter for wireless transmission of the obtained signals.

In an embodiment the unbonded flexible pipe comprises a first end terminated with an end fitting wherein at least the innermost sealing sheath is anchored such as it is known in the art and the optical fiber advantageously exits the unbonded flexible pipe via the end fitting.

In an embodiment where the unbonded flexible pipe comprises an outermost layer, the optical fiber exits the unbonded flexible pipe via the outermost layer.

For example the unbonded flexible pipe can comprises a first end terminated with an end fitting wherein at least the innermost sealing sheath is anchored, and the optical fiber exits the unbonded flexible pipe at an exit distance from the end fitting determined along the length of the unbonded flexible pipe.

In an embodiment the exit distance is up to about 10 m, such as up to about 20 m.

In an embodiment the unbonded flexible pipe comprises a liquid impervious outer protecting sheath, the optical fiber exits the unbonded flexible pipe through an opening in the liquid impervious outer protecting sheath where the opening is provided by removing a wall part of the liquid impervious outer protecting sheath.

In an embodiment the unbonded flexible pipe comprises a liquid impervious outer protecting sheath which is terminated at a termination distance from the end fitting thereby providing an outer protection sheet free section, and the optical fiber exits the unbonded flexible pipe by exiting at the outer protection sheet free section.

The liquid impervious outer protecting sheath adjacent to the opening or the outer protection sheet free section is advantageously sealed to at least one underlying layer by a sealing material e.g. a cement, such as epoxy.

In an embodiment the unbonded flexible pipe is as described in co-pending application DK PA 201270409 hereby incorporated by reference. In this embodiment the unbounded flexible pipe has a length and a longitudinal axis and comprising an inner sealing sheath defining a bore, a pressure armor layer, an intermediate sealing sheath and a tensile armor, wherein the pressure armor layer comprises at least one elongate metal element arranged with pressure armor gaps and is arranged in an annulus provided between the inner sealing sheath and the intermediate sealing sheath, the tensile armor being arranged on the outer side of the intermediate sealing sheath, wherein the intermediate sealing sheath forms a drainage layer or the unbonded flexible pipe further comprises a drainage layer arranged in the annulus, the drainage layer comprises at least one drainage path arranged along the length of the pipe, wherein the drainage path is in fluid communication with the pressure armor gaps, wherein the drainage layer comprises a signal transmitting element, the signal transmitting element is preferably arranged in a drainage path. The transmitting element is an optical fiber and preferably the transmitting element is part of or constitutes a sensor arrangement e.g. for measurement of temperature, a chemical concentration and/or pressure in the annulus.

In an embodiment the transmitting element is part of or constitutes a sensor arrangement for determining at least one parameter, such as pressure, temperature, pH-value, concentrations of selected components, flow velocity, clearance of the pathway and/or leakage of the inner sealing sheath and/or the intermediate sealing sheath.

In an embodiment the unbounded flexible pipe is as described in co-pending application DK PA 2012 00185 hereby incorporated by reference. In this embodiment the unbounded flexible pipe comprises a tensile reinforcement layer comprising a plurality of elongate reinforcement elements each comprising a plurality of elongate armor strips and an elongate support element comprising a channel, wherein the plurality of elongate armor strips are arranged in the channel of the elongate support element, preferably the elongate armor strips are arranged to be superimposed in the channel and the tensile armor layer further comprises at least one elongate blind element, the elongate reinforcement elements and the at least one elongate blind element being helically wound in a side-by-side relation. The elongate blind element(s) is/are provided by elongate support element(s) without armor strips and at least one elongate blind element comprises a fiber sensor.

All features of the inventions including ranges and preferred ranges can be combined in various ways within the scope of the invention, unless there are specific reasons not to combine such features.

BRIEF DESCRIPTION OF DRAWINGS

The invention will be explained more fully below in connection with a preferred embodiment and with reference to the drawings in which.

The figures are schematic and simplified for clarity. Throughout the description of the figures, the same reference numerals are used for identical or corresponding parts.

Figure 1:
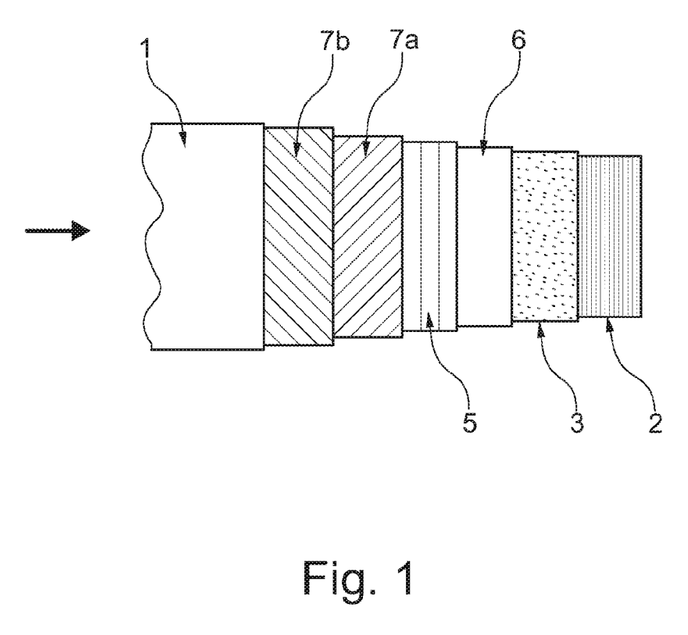
FIG. 1 is a schematic side view of an unbonded flexible pipe of the invention.

The flexible pipe shown in FIG. 1 comprises an innermost sealing sheath 6, often also called an inner liner or simply an inner sealing sheath. The innermost sealing sheath is e.g. of high density polyethylene (HDPE), cross linked polyethylene (PEX), Polyvinyldifluorid (PVDF) or polyamide (PA). The inner sealing sheath 6 has the purpose of preventing outflow of the fluid transferred in the bore of the pipe, indicated with the fat arrow. Inside the inner sealing sheath 6 the pipe comprises an optical fiber containing layer 3 and an inner armor layer 2, called a carcass which is normally of metal, and has the main purpose of reinforcing the pipe against collapse as described above. The carcass 2 is not liquid tight. The unbonded flexible pipe of the invention can also be provided without a carcass as described above. The optical fiber containing layer 3 comprises at least one tape and at least one optical fiber as described above. An optical fiber is advantageously incorporated into to the tape, preferably by being embedded in the tape or by being sandwiched between two sub-layers of the tape.

On the outer side of the inner sealing sheath 6, the flexible pipe comprises a pressure armor layer 5, which is often of helically wound armor element(s) of metal or composite material or combinations, which is wound with an angle to the axis of the pipe of about 65 degrees or more e.g. about 85 degrees. The pressure armor layer 5 is not liquid tight.

Outside the pressure armor layer 5, the pipe comprises two cross wound tensile armor layers 7a, 7b wound from elongate armor elements. The elongate armor elements of the innermost tensile armor layer 7a are wound with a winding degree of about 55 degrees or less to the axis of the pipe in a first winding direction and the outermost tensile armor layer 7b is wound with a winding degree of about 60 degrees or less, such as between about 20 and about 55 degrees to the axis of the pipe in a second winding direction, which is the opposite direction to the first winding direction. The two tensile armor layers 7a, 7b with such opposite winding directions are normally referred to as being cross wound. The pipe further comprises an outer sealing sheath 1 protecting the armor layer mechanically and optionally against ingress of sea water. As described above the outer sealing sheath need not be liquid tight. The unbonded flexible pipe preferably comprises not shown anti-friction layers between the armor layers 5, 7a, 7b. The anti-friction layers are usually not liquid tight and may for example be in the form of a wound film.

Figure 2:
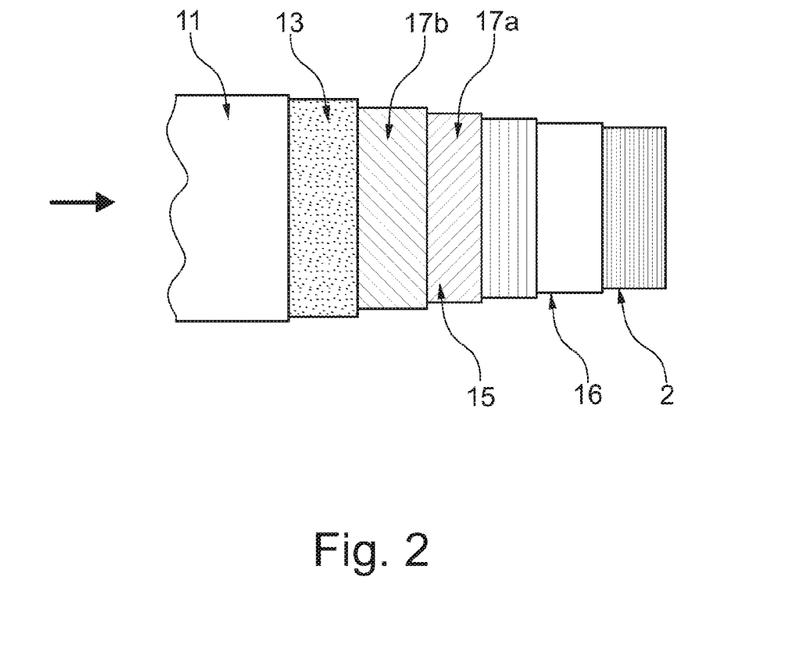
FIG. 2 is a schematic side view of another unbonded flexible pipe of the invention.

The flexible pipe shown in FIG. 2 comprises an innermost sealing sheath 16, and inside the inner sealing sheath 16 the pipe comprises an inner armor layer 12.

On the outer side of the inner sealing sheath 16, the flexible pipe comprises a not liquid tight pressure armor layer 15 comprising helically wound armor element(s) of metal or composite material or combinations, which is wound with an angle to the axis of the pipe of about 65 degrees or more e. g. about 85 degrees.

Outside the pressure armor layer 15, the pipe comprises two cross wound tensile armor layers 17a, 17b wound from elongate armor elements. Outside the outermost tensile armor layer 17b the unbonded flexible pipe comprises an optical fiber containing layer 13. The pipe further comprises an outer sealing sheath 11 protecting the armor layer mechanically and optionally against ingress of sea water. The unbonded flexible pipe preferably comprises not shown anti-friction layers between the armor layers 15, 17a, 17b.

The optical fiber containing layer 13 comprises at least one tape and at least one optical fiber as described above. The optical fiber is advantageously incorporated into the tape, preferably by being embedded in the tape or by being sandwiched between two sub-layers of the tape.

Figure 3:
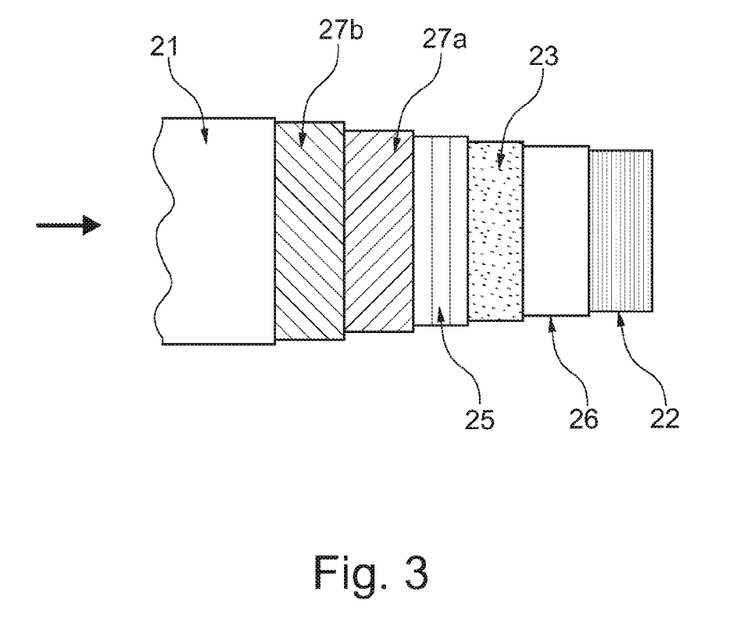
FIG. 3 is a schematic side view of a further unbonded flexible pipe of the invention.

The flexible pipe shown in FIG. 3 comprises an innermost sealing sheath 26, and inside the inner sealing sheath 26 the pipe comprises an inner armor layer 22.

On the outer side of the inner sealing sheath 26, the flexible pipe comprises an optical fiber containing layer 23. The optical fiber containing layer 23 comprises at least one tape and at least one optical fiber as described above. An optical fiber is advantageously incorporated into to the tape, preferably by being embedded in the tape or by being sandwiched between two sub-layers of the tape.

On the outer side of the optical fiber containing layer 23, the flexible pipe comprises a not liquid tight pressure armor layer 25 comprising helically wound armor element(s) of metal or composite material or combinations, which is wound with an angle to the axis of the pipe of about 65 degrees or more e. g. about 85 degrees.

Outside the pressure armor layer 25, the pipe comprises two cross wound tensile armor layers 27a, 27b wound from elongate armor elements. Outside the outermost tensile armor layer 27b the unbonded flexible pipe comprises an optical fiber containing layer 23. The pipe further comprises an outer sealing sheath 21 protecting the armor layer mechanically and optionally against ingress of sea water. The unbonded flexible pipe preferably comprises not shown anti-friction layers between the armor layers 25, 27a, 27b.

The pipe of the invention may have more or less layers than the pipes of FIGS. 1, 2 and 3, and some layers may be replaced by other layers provided that the pipe comprises at least one optical fiber containing layer as described above and according to the invention. For example the pipe may comprise additional polymer layer or layers—e.g. in the form of an intermediate sealing sheath. Such additional polymer layer or layers may be applied between the respective armor layers. For example the pipe may comprise insulating layer or layers e.g. applied between the outermost tensile armor layer and the outer sheath. The type of layers and order of layers may e.g. be as described in documents GB 1 404 394, U.S. Pat. No. 3,311,133, U.S. Pat. No. 3,687,169, U.S. Pat. No. 3,858,616, U.S. Pat. No. 4,549,581, U.S. Pat. No. 4,706,713, U.S. Pat. No. 5,213,637, U.S. Pat. No. 5,407,744, U.S. Pat. No. 5,601,893, U.S. Pat. No. 5,645,109, U.S. Pat. No. 5,669,420, U.S. Pat. No. 5,730,188, U.S. Pat. No. 5,730,188, U.S. Pat. No. 5,813,439, U.S. Pat. No. 5,837,083, U.S. Pat. No. 5,922,149, U.S. Pat. No. 6,016,847, U.S. Pat. No. 6,065,501, U.S. Pat. No. 6,145,546, U.S. Pat. No. 6,192,941, U.S. Pat. No. 6,253,793, U.S. Pat. No. 6,283,161, U.S. Pat. No. 6,291,079, U.S. Pat. No. 6,354,333, U.S. Pat. No. 6,382,681, U.S. Pat. No. 6,390,141, U.S. Pat. No. 6,408,891, U.S. Pat. No. 6,415,825, U.S. Pat. No. 6,454,897, U.S. Pat. No. 6,516,833, U.S. Pat. No. 6,668,867, U.S. Pat. No. 6,691,743, U.S. Pat. No. 6,739,355 U.S. Pat. No. 6,840,286, U.S. Pat. No. 6,889,717, U.S. Pat. No. 6,889,718, U.S. Pat. No. 6,904,939, U.S. Pat. No. 6,978,806, U.S. Pat. No. 6,981,526, U.S. Pat. No. 7,032,623, U.S. Pat. No. 7,311,123, U.S. Pat. No. 7,487,803, US 23102044, WO 28025893, WO 2009024156, WO 2008077410 and/or WO 2008077409, as well as in Specification for Unbonded Flexible Pipe, API, 17J, Third edition, July 2008 and/or in Recommended Practice for Flexible Pipe, API, 17B, Fourth edition, July 2008, provided that at least one armor layer is a displacement reduced armor layer as described herein.

Figure 4:
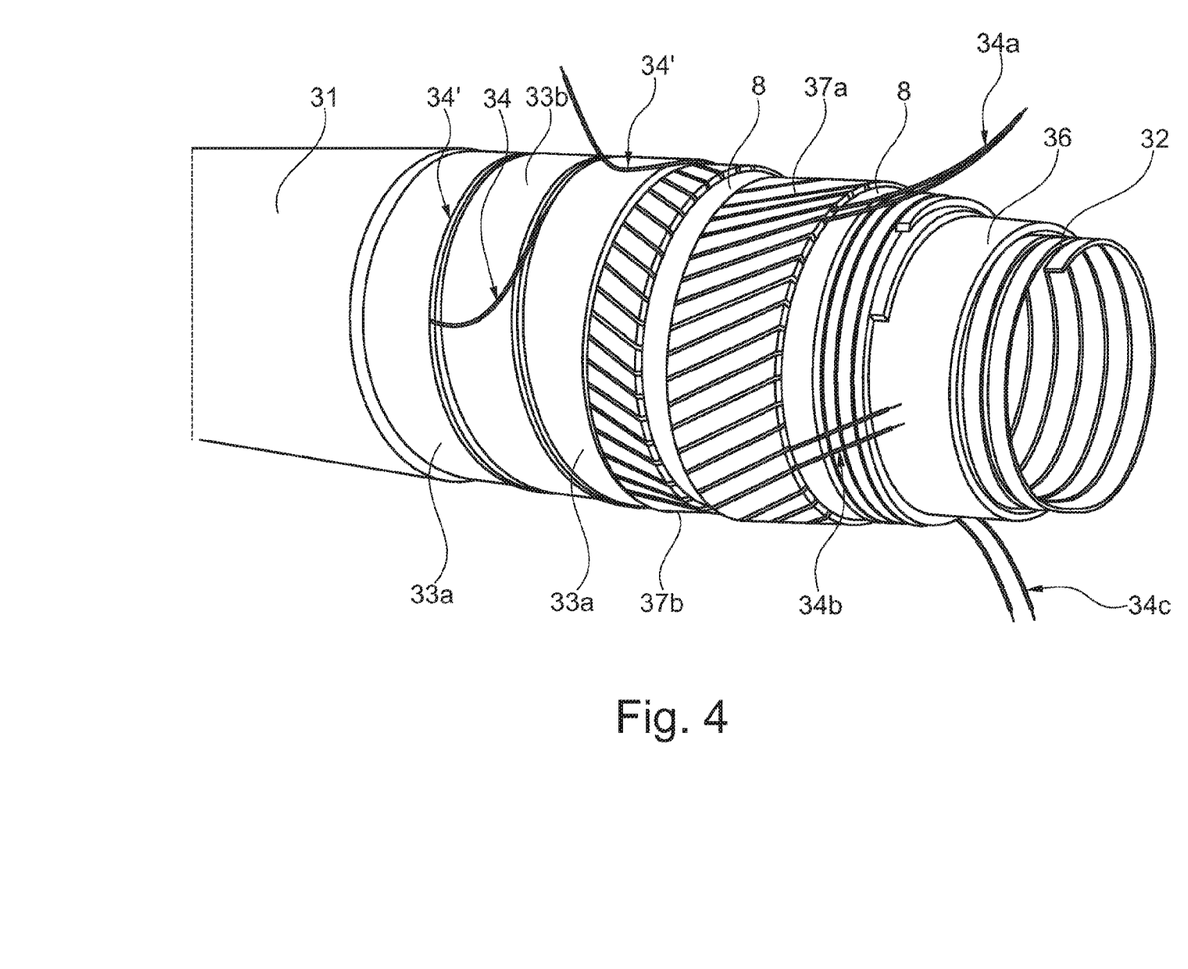
FIG. 4 is a perspective view of an unbonded flexible pipe of the invention wherein the respective layers are exposed.

The flexible pipe shown in FIG. 4 comprises an innermost sealing sheath 36, and inside the inner sealing sheath 36 the pipe comprises an inner armor layer 32.

On the outer side of the inner sealing sheath 36, the flexible pipe comprises a not liquid tight pressure armor layer 35 comprising helically wound armor element(s) of metal or composite material or combinations, which is wound with an a high angle to the axis of the pipe of about 86-88 degrees.

Outside the pressure armor layer 35, the pipe comprises two cross wound tensile armor layers 37a, 37b wound from elongate armor elements. Between the armor layers 35, 37a, 37b, the unbonded flexible pipe comprises anti-friction layers e.g. in the form of wound polymer containing tape, such as a tape of woven fibers impregnated with a resin. The outermost tensile armor layer 37b comprises pairs of fibers 24a, 34b, 34c wound in helical gaps between the elongate armor elements e.g. for monitoring the integrity of the wires as described in PCT/DK2011/050426.

Outside the outermost tensile armor layer 37b the unbonded flexible pipe comprises an optical fiber containing layer composed of helically wound tapes 33a, 33b and optical fibers 34, 34' wound with a relatively high winding angle such that the length of the optical fibers 34, 34' relative to the length of the pipe is relatively high. Preferably the length of the optical fibers 34, 34' is at least about $\pi r^2$, preferably at least about 1.5 $\pi r^2$, more preferably at least about 1.8 $\pi r^2$, where r is the radius of the outermost tensile armor layer 37b determined from its outer surface.

The pipe further comprises an outer sealing sheath 31 protecting the armor layer mechanically and against ingress of sea water.

Figure 5:
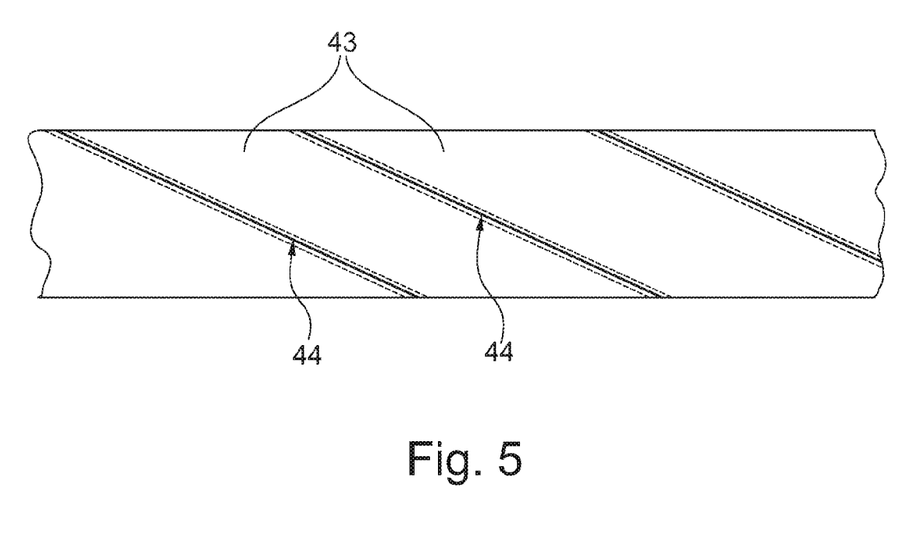
FIG. 5 is a schematic side view of a layer of an unbonded flexible pipe of the invention comprising an optical fiber.

FIG. 5 shows an optical fiber containing layer of an unbonded flexible pipe of the invention. The optical fiber containing layer comprises one or more tapes 43 helically wound to provide a helical gap between windings where one or more optical fibers 44 are arranged in the helical gap. In the embodiment shown in FIG. 5 the winding degree of the optical fiber(s) 44 is about 45 degrees.

Figure 6:
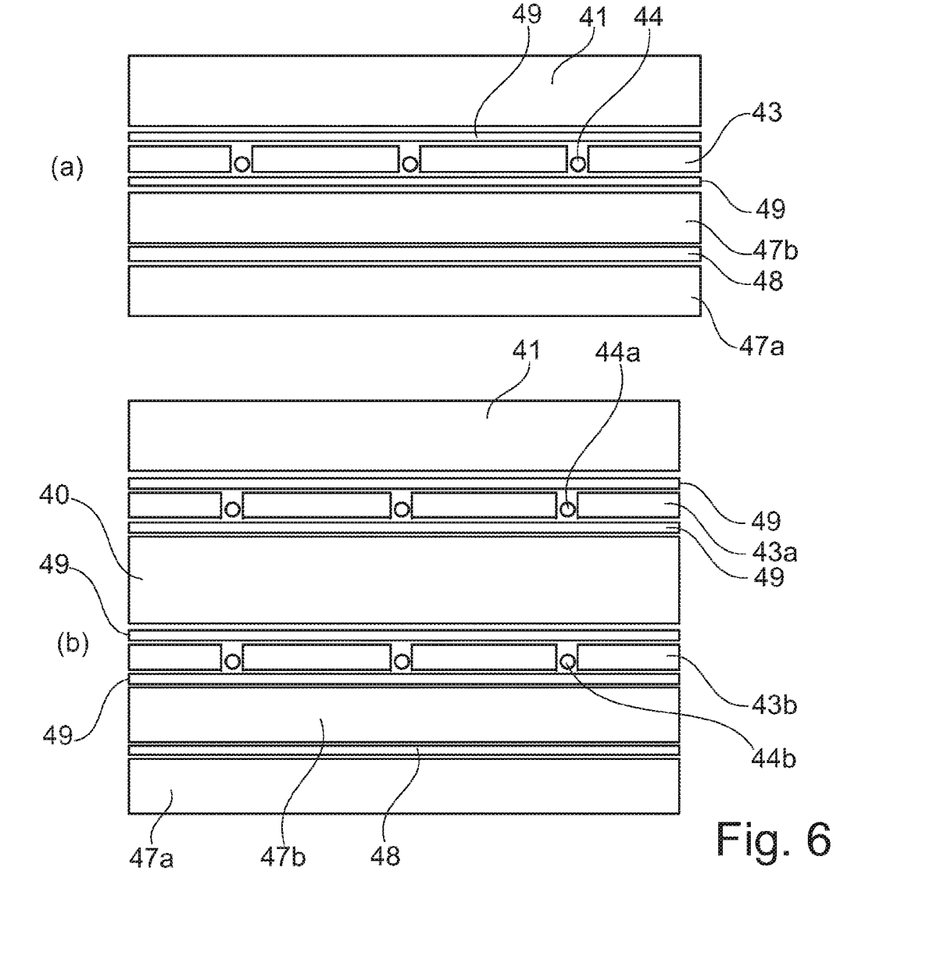
FIG. 6a is a cross-sectional view of a wall section of an unbonded flexible pipe of the invention comprising a plurality of layers. The cross-section is taken in longitudinal direction parallel to the longitudinal axis of the pipe. Only some of the layers are shown.
FIG. 6b is a cross-sectional view of a wall section of another unbonded flexible pipe of the invention comprising a plurality of layers. The cross-section is taken in longitudinal direction parallel to the longitudinal axis of the pipe. Only some of the layers are shown.

FIG. 6a shows a wall section of an unbonded flexible pipe of the invention comprising a plurality of layers. The outermost layer is an outer sealing sheath 41. Inside the outer sealing sheath 41 the pipe comprises an optical fiber containing layer as shown in FIG. 5 applied between a first and a second tape 49 e.g. of woven polymer e.g. of polyester, polyamide and or polyethylene (e.g. of Diolen®). Inside the second tape 49 the pipe comprises two cross wound tensile armor layers 47a, 47b wound from elongate armor elements and with an anti-wear layer 48 arranged between the two cross wound tensile armor layers 47a, 47b. The layers of the pipe inside the innermost tensile armor layer 47b are not shown.

The tapes 49 arranged above and below the optical fiber containing layer are applied for mechanical protection as well as for production reasons.

The pipe wall section shown in FIG. 6b is a variation of the wall section shown in FIG. 6a and comprises an outer sealing sheath 41 and inside the outer sealing sheath 41 the pipe comprises an optical fiber containing layer e.g. as shown in FIG. 5 which comprises tape(s) 43a and optical fiber(s) 44a. The optical fiber containing layer is applied between a first and a second tape 49. Inside the second tape 49 the pipe comprises an insulation layer 40, and further inside the pipe comprises a second optical fiber containing layer as shown in FIG. 5 which comprises tape(s) 43b and optical fiber(s) 44b. The optical fiber containing layer is applied between a first and a second tape 49. Further inside the pipe comprises two cross wound tensile armor layers 47a, 47b wound from elongate armor elements and with an anti-wear layer 48 arranged between the two cross wound tensile armor layers 47a, 47b. The layers of the pipe inside the innermost tensile armor layer 47b are not shown.

Figure 7:
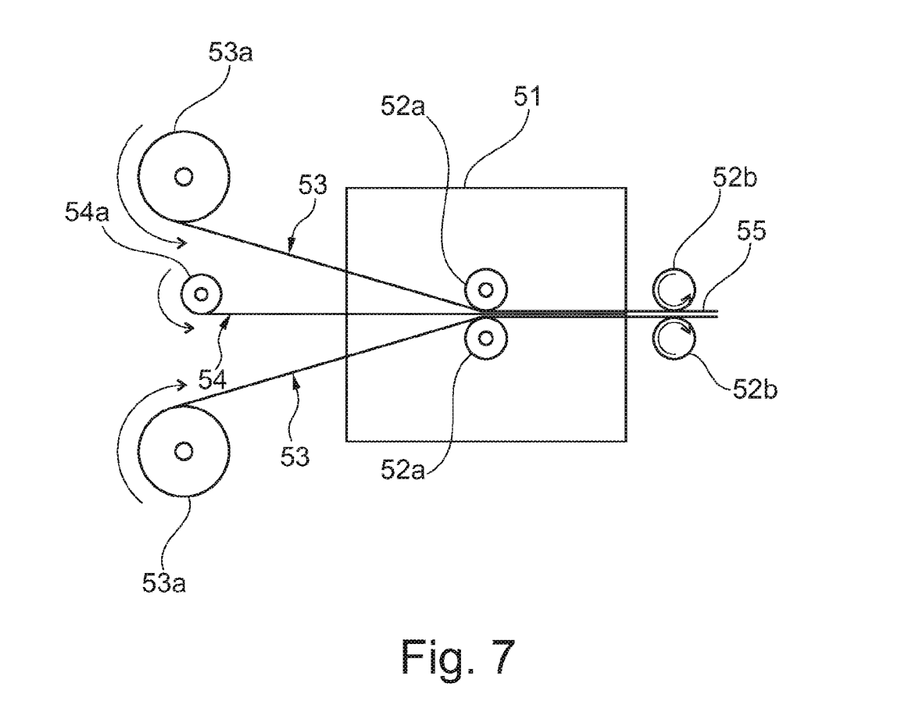
FIG. 7 shows a production setup for incorporating an optical fiber into a tape to provide an integrated fiber tape.

FIG. 7 shows a production setup for incorporating an optical fiber into a tape to provide an integrated fiber tape. An optical fiber 54 is fed from a bobbin 54a comprising wound optical fiber. Two polymer containing sub-layer tapes 53, preferably identical tapes, are fed from respective bobbins 53a to incorporate the optical fiber 54 between the two sub-layer tapes 53. The production setup advantageously comprises a not shown movable control unit for arranging the optical fiber 54 with S-shaped folds between the tapes 53. The production setup further comprises a heating zone 51 where the tapes 53 are at least partly fused to integrate the fiber to obtain the optical fiber containing tape in the form of an integrated fiber tape 55.

Rollers 52 are pressing the sub-layer tapes 53 together to ensure a desired fusing of the sub-layer tapes 53 around the optical fiber 54. Further rollers 52b are applied at the exit of the heating zone to ensure a stable fusion and a uniform thickness. The final integrated fiber tape 55 is optionally wound onto a not shown bobbin for storing or it may be directly applied in the production of an unbonded flexible pipe of the invention.

Figure 8:
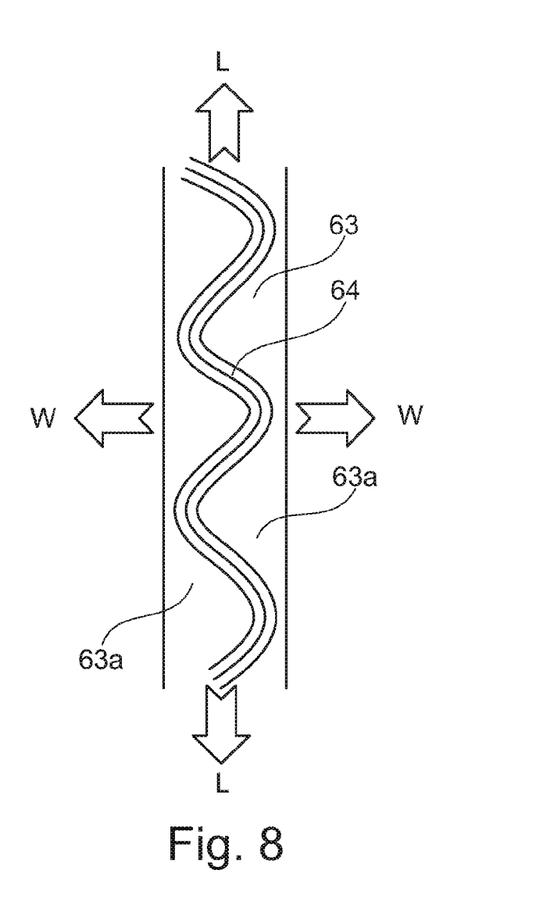
FIG. 8 is a schematic top view of an integrated fiber tape.

FIG. 8 is a schematic top view of an integrated fiber tape e.g. produced as shown in FIG. 5. The integrated fiber tape comprises fiber 64 and tape 63 of fused sub-layer tapes sandwiching the optical fiber 64. The optical fiber 54 is arranged to be folded with S-shaped folds. The sub-layer tapes are fused at least along their two edges 63a, 63b to fully encase the optical fiber 54. Advantageously the sub-layer tapes are not fused to each other in a not shown clearance zone along the optical fiber such that the integrated fiber tape can be stretched in its length direction L-L without breaking the optical fiber, i.e. the optical fiber 54 is allowed to partly or fully unfold from its S-shaped folds. Accordingly the sub-layer tapes advantageously have a relatively high linear elasticity as described above. In its width direction W-W the sub-layer tapes can have a lower elasticity.

Figure 9:
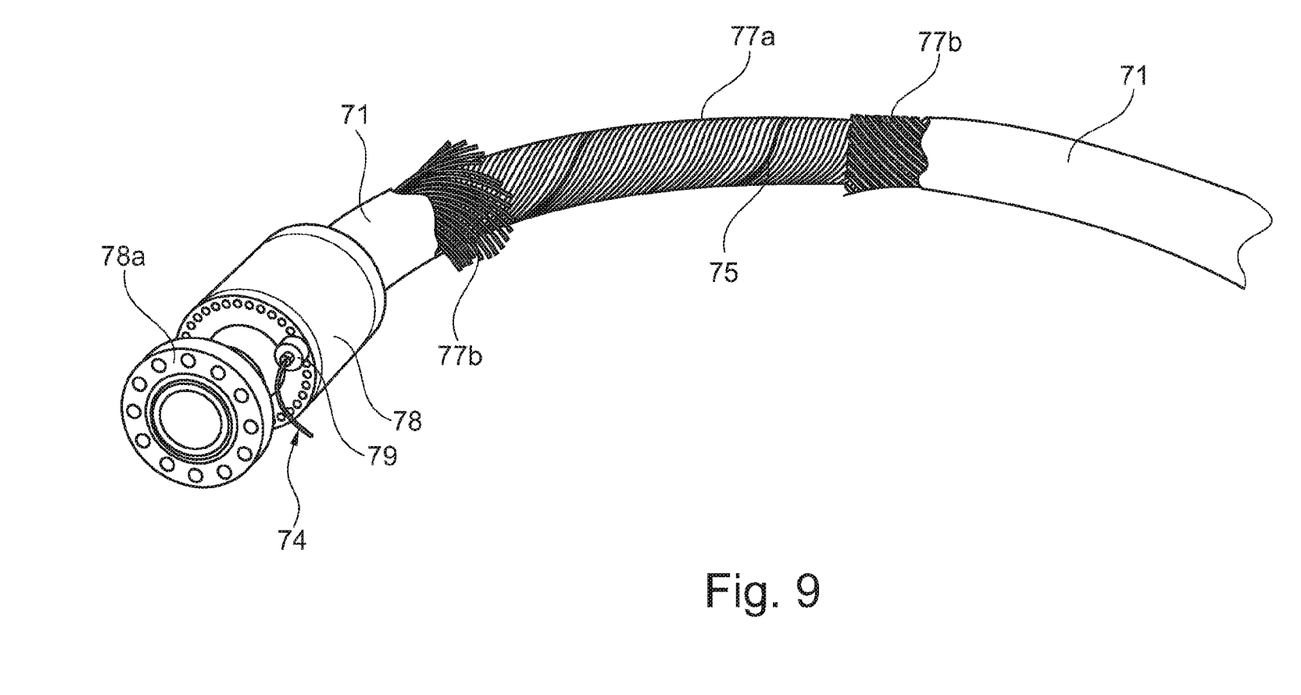
FIG. 9 is a perspective view of an unbonded flexible pipe of the invention comprising an integrated fiber tape wherein the layers above the integrated fiber tape are removed in a pipe section to expose the integrated fiber tape.

The unbonded flexible pipe shown in FIG. 9 has an outer sealing sheath 71 and two cross wound tensile armor layers 77a, 77b comprising an outermost tensile layer 77b and an innermost tensile layer 77a. Between the two cross wound tensile armor layers 77a, 77b the pipe comprises an optical fiber containing layer comprising integrated fiber tape 75 comprising an optical fiber 74. The optical fiber containing layer advantageously comprises additional not shown tapes helically wound around the innermost tensile layer 77a. The unbonded flexible pipe further comprises an end-fitting 78 with a coupling flange 78a, the end-fitting 78 is terminating the respective layers of the pipe. Such end-fittings are e.g. described in "Recommended Practice for Flexible Pipe", ANSI/API 17 B, fourth Edition, July 2008, and the standard "Specification for Unbonded Flexible Pipe", ANSI/API 17J, Third edition, July 2008. The end-fitting 78 is further provided with an exit house 79 for exit of the fiber 74.

Further scope of applicability of the present invention will become apparent from the detailed description given herein. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. A unbonded flexible pipe having a length and a longitudinal axis and comprising an innermost sealing sheath defining a bore, at least one armor layer surrounding the inner sealing sheath and at least one optical fiber containing layer, wherein the optical fiber containing layer comprises at least one tape and at least one optical fiber arranged with a length of at least about 3 times the length of the flexible pipe and wherein the optical fiber is a part of a temperature sensor system.

2. The unbonded flexible pipe of claim 1, wherein the optical fiber is arranged with a length of at least about 5 times the length of the flexible pipe.

3. The unbonded flexible pipe of claim 1, wherein the optical fiber is helically wound or arranged with folds to ensure its length of at least about 3 times the length of the flexible pipe.

4. The unbonded flexible pipe of claim 1, wherein the optical fiber containing layer comprises a plurality of tapes.

5. The unbonded flexible pipe of claim 1, wherein the tape(s) of said optical fiber containing layer has/have a length direction and a width perpendicular to its length direction, the width of the tape(s) being least about 3 cm.

6. The unbonded flexible pipe of claim 1, wherein the tape(s) of said optical fiber containing layer has/have a thickness determined in axial direction of the pipe, the thickness of the wound tape(s) being from about 1 mm to about 4 mm.

7. The unbonded flexible pipe of claim 1, wherein the tape(s) is/are of composite material comprising or consisting of polymer and reinforcement elements.

8. The unbonded flexible pipe of claim 1, wherein the tape(s) is/are woven tapes comprising woven yarns and/or strands impregnated with a thermoplastic resin, selected from a thermoplastic resin comprising polyamide (PA), polybutylene terephthalate (PBT), thermoplastic polyester (PET), polycarbonate (PC), polyethylene (PE), polypropylene (PP), polyvinyl chloride (PVC) and mixtures comprising one or more of these thermoplastic resins.

9. The unbonded flexible pipe of claim 1, wherein the sensor system additionally is configured for sensing strain, vibrations, pressure and/or sound.

10. The unbonded flexible pipe of claim 1, wherein said at least one tape and said at least one optical fiber are helically wound to surround the longitudinal axis of the flexible pipe and wherein the optical fiber is wound with an angle to the longitudinal axis which is substantially identical to the winding direction of the helically wound tape(s).

11. The unbonded flexible pipe of claim 1, wherein said at least one tape and said at least one optical fiber are helically wound to surround the longitudinal axis of the flexible pipe and wherein the tape(s) is/are wound with a helical gap between windings of the helically wound tape(s), the optical fiber is arranged in said helical gap.

12. The unbonded flexible pipe of claim 1, wherein said optical fiber is incorporated into said at least one tape of said optical fiber containing layer to provide an integrated fiber tape.

13. The unbonded flexible pipe of claim 12, wherein said optical fiber is incorporated into said at least one tape of said optical fiber containing layer by being held between two sub-layers of the tape.

14. The unbonded flexible pipe of claim 13, wherein said sub-layers of the tape are fused or adhered together, allowing a clearance zone along at least a part of the length of the optical fiber to not be fused or adhered.

15. The unbonded flexible pipe of claim 12, wherein said optical fiber is arranged with folds along the length of the tape.

16. The unbonded flexible pipe of claim 15, wherein said tape has a length and a width, the tape in its length direction has a linear elasticity of from about 25% to about 500%.

17. The unbonded flexible pipe of claim 15, wherein said tape comprising the incorporated optical fiber arranged with folds along the length of the tape is helically wound to surround the longitudinal axis of the flexible pipe with a winding degree of from about 10 to about 55 degrees.

18. The unbonded flexible pipe of claim 1, wherein the optical fiber containing layer is arranged outside the innermost sealing sheath.

19. The unbonded flexible pipe of claim 1, wherein the unbonded flexible pipe comprises one or more armor layers arranged outside the innermost sealing sheath, the optical fiber containing layer is arranged outside the one or more armor layers.

20. The unbonded flexible pipe of claim 1, wherein the unbonded flexible pipe comprises an outer protecting layer, the optical fiber containing layer is arranged inside the outer protecting layer.

21. The unbonded flexible pipe of claim 1, wherein the unbonded flexible pipe comprises a first end terminated with an end fitting and wherein at least the innermost sealing sheath is anchored, the optical fiber exits the unbonded flexible pipe via said end fitting.

22. The unbonded flexible pipe of claim 1, wherein the unbonded flexible pipe comprises a liquid impervious outer protecting sheath and the optical fiber exits the unbonded flexible pipe through an opening in said liquid impervious outer protecting sheath.

23. The unbonded flexible pipe of claim 22, wherein said liquid impervious outer protecting sheath adjacent to said opening is sealed to at least one underlying layer.

* * * * *